(12) United States Patent
Matsumoto et al.

(10) Patent No.: US 9,325,005 B2
(45) Date of Patent: Apr. 26, 2016

(54) POSITIVE ELECTRODE ACTIVE MATERIAL, METHOD FOR PRODUCING SAME, AND NON-AQUEOUS ELECTROLYTE SECONDARY BATTERY USING SAME

(75) Inventors: Satoshi Matsumoto, Niihama (JP); Isao Abe, Niihama (JP); Yutaka Kawatate, Kadoma (JP); Norihiro Yamamoto, Kadoma (JP); Shinji Arimoto, Kadoma (JP)

(73) Assignees: SUMITOMO METAL MINING CO., LTD., Tokyo (JP); PANASONIC CORPORATION, Kadoma-shi (JP)

( * ) Notice: Subject to any disclaimer, the term of this patent is extended or adjusted under 35 U.S.C. 154(b) by 106 days.

(21) Appl. No.: 13/387,241
(22) PCT Filed: Jul. 28, 2010
(86) PCT No.: PCT/JP2010/062683
§ 371 (c)(1),
(2), (4) Date: Jan. 26, 2012
(87) PCT Pub. No.: WO2011/016372
PCT Pub. Date: Feb. 10, 2011

(65) Prior Publication Data
US 2012/0119167 A1 May 17, 2012

(30) Foreign Application Priority Data
Aug. 4, 2009 (JP) .................................. 2009-181223

(51) Int. Cl.
*H01B 1/02* (2006.01)
*H01M 4/505* (2010.01)
*C01G 53/00* (2006.01)
*H01M 4/13* (2010.01)
*H01M 4/58* (2010.01)
*H01M 4/00* (2006.01)

(52) U.S. Cl.
CPC ............... *H01M 4/505* (2013.01); *C01G 53/42* (2013.01); *C01G 53/50* (2013.01);
(Continued)

(58) Field of Classification Search
USPC ........ 252/500, 519.15; 423/594.4; 429/231.1, 429/233, 223, 224, 231.3, 231.9, 231.95
See application file for complete search history.

(56) References Cited

U.S. PATENT DOCUMENTS

2007/0231694 A1* 10/2007 Abe et al. .................. 429/231.1

FOREIGN PATENT DOCUMENTS

| JP | 5-242891 A | 9/1993 |
| JP | 6-342657 A | 12/1994 |

(Continued)

OTHER PUBLICATIONS

International Search Report of PCT/JP2010/062683, mailing date Nov. 2, 2010.

*Primary Examiner* — Bijan Ahvazi
(74) *Attorney, Agent, or Firm* — Westerman, Hattori, Daniels & Adrian, LLP

(57) ABSTRACT

A lithium nickel composite oxide, having small inner resistance, large battery capacity and high thermal stability, can be used as a positive electrode active material for a non-aqueous electrolyte secondary battery. The positive electrode active material is composed of the lithium nickel composite oxide of $Li_bNi_{1-a}M_aO_2$ (wherein M represents at least one element selected from a transition metal element other than Ni, the second group element and the thirteenth group element; a satisfies $0.01 \leq a \leq 0.5$; and b satisfies $0.9 \leq b \leq 1.1$). This is obtained by filtering and drying the fired powder after water washing, wherein it is dried at 90° C. or lower, till moisture is reduced to 1% or less by mass in drying, and then at 120° C., and under gas atmosphere where content of compound components containing carbon is 0.01% or less by volume, or under vacuum atmosphere.

8 Claims, 1 Drawing Sheet

(52) U.S. Cl.
CPC ........ *C01P 2002/50* (2013.01); *C01P 2002/88* (2013.01); *C01P 2006/12* (2013.01); *C01P 2006/40* (2013.01); *C01P 2006/80* (2013.01); *Y02E 60/122* (2013.01); *Y02P 70/54* (2015.11)

(56) References Cited

FOREIGN PATENT DOCUMENTS

| JP | 2000-223122 | | * | 8/2000 | ............. | H01M 4/58 |
|----|----|----|----|----|----|----|
| JP | 2000-223122 | A | | 8/2000 | | |
| JP | 2003-017054 | A | | 1/2003 | | |
| JP | 2004-002141 | | * | 1/2004 | ............. | C01G 53/00 |
| JP | 2004-002141 | A | | 1/2004 | | |
| JP | 2005-187282 | | * | 7/2005 | ............. | C01G 53/00 |
| JP | 2005-187282 | A | | 7/2005 | | |
| JP | 2007-273106 | A | | 10/2007 | | |
| JP | 2007-273108 | A | | 10/2007 | | |
| JP | 2207228 | A1 | * | 7/2010 | ............. | H01M 4/52 |
| WO | 2009/041722 | A1 | | 4/2009 | | |

* cited by examiner

POSITIVE ELECTRODE ACTIVE MATERIAL, METHOD FOR PRODUCING SAME, AND NON-AQUEOUS ELECTROLYTE SECONDARY BATTERY USING SAME

TECHNICAL FIELD

The present invention relates to a positive electrode active material, a method for producing the same and a non-aqueous electrolyte secondary battery using the same, and more specifically, the present invention relates to a lithium nickel composite oxide for a positive electrode active material, having inner resistance smaller than a conventional one, and at least equivalent degree of battery capacity and thermal stability as a conventional one, when used as the positive electrode active material of a battery, a method for producing the same, and still more a non-aqueous electrolyte battery using the same.

BACKGROUND ART

In recent years, with rapid expansion of a compact-type electronic device such as a mobile phone, a notebook-type personal computer, demand of the non-aqueous electrolyte secondary battery, as a power source enabling charge-discharge, has been increasing rapidly. As the positive electrode active material for the non-aqueous electrolyte secondary battery, a lithium cobalt composite oxide represented by lithium cobaltate ($LiCoO_2$), as well as the lithium nickel composite oxide represented by lithium nickelate ($LiNiO_2$), a lithium manganese composite oxide represented by lithium manganate ($LiMnO_2$) and the like have been widely used.

Cobalt used in lithium cobaltate is expensive due to scarce reserves, and thus has problems of unstable supply and large price fluctuation. In addition, in the case of using lithium cobaltate or the lithium nickel cobalt composite oxide obtained by its modification, there has been a problem of gradual destruction of a crystal structure caused by large change thereof in charging-discharging, resulting in decrease in discharge capacity.

Lithium manganate or lithium nickelate having manganese or nickel as a main component, which is relatively cheap, has been attracted attention in view of cost, however, lithium manganate has many practical problems as a battery, because of having very small charge-discharge capacity, as well as having very short charge-discharge cycle characteristics, which indicates battery lifetime in using as a battery.

On the other hand, lithium nickelate is expected as the positive electrode active material which is capable of producing battery with high energy density in low cost, because of showing larger charge-discharge capacity as compared with lithium cobaltate, however, had a defect of inferior heat stability in a charged state as compared with lithium cobaltate. That is, pure lithium nickelate has a problem in heat stability or charge-discharge cycle characteristics, and thus it was impossible to be used as a practical battery. This is because of having lower stability of a crystal structure in a charged state, as compared with lithium cobaltate.

Under such a circumstance, in order to provide a non-aqueous battery which is capable of decreasing change of a crystal structure in charge-discharge, dramatically increasing discharge capacity, as well as enhancing thermal stability, there has been proposed an invention for using, as a positive electrode material, $Li_aM_bNi_cCO_dO_e$ (wherein M is at least one kind of a metal selected from the group consisting of Al, Mn, Sn, in, Fe, V, Cu, Mg, Ti, Zn, Mo; a, b, c, d and e are in a range of $0<a<1.3$, $0.02 \leq b \leq 0.5$, $0.02 \leq d/c+d \leq 0.9$, $1.8<e<2.2$; and further $b+c+d=1$) (Refer to pages 1 and 2 of PATENT LITERATURE 1).

In this invention, it is said that by configuring M of the positive electrode active material by at least one kind of a metal selected from the group consisting of Cu and Fe, thermal stability can be enhanced significantly, in the presence of an electrolytic solution after charging.

However, the above lithium nickel composite oxide has a problem of practically decreasing charge-discharge capacity, due to substitution of a part of nickel with other elements. In addition, there is a serious problem that ratio of discharge capacity relative to initial time charge capacity (initial time charge-discharge efficiency) decreases significantly, in the case where the lithium nickel composite oxide contains Al. In addition, such a problem has also been pointed out that, because of presence of lithium carbonate or lithium sulfate inside the positive electrode active material after synthesis, these lithium compounds generate gas by oxidative decomposition, when the positive electrode active material is charged under high temperature environment.

In recent years, the lithium nickel composite oxide has become to be used as the positive electrode active material also in a polymer-based battery which uses an aluminum laminate material or the like as an exterior packaging, however, in such a case, as described above, generation of gas by decomposition of lithium carbonate or the like in the lithium nickel composite oxide, during use of a battery, incurs dimensional defect, or significantly deteriorates battery performance. To eliminate such a problem, such an invention has been proposed that prevents generation of lithium carbonate inside the positive electrode active material, by adding natural water to the lithium composite oxide obtained by heat treatment, to attain a slurry concentration of 300 g/l, stirring and removing an unreacted lithium salt, so as to remove lithium carbonate in the lithium nickel composite oxide after synthesis (Refer to page 2 of PATENT LITERATURE 2).

However, this method increases $Li^+$ ion concentration in water, which could re-precipitate lithium hydroxide or lithium carbonate after drying, as well as has a problem of easy deterioration of charge-discharge capacity.

To eliminate such a defect, there has been disclosed a method for obtaining the lithium nickel composite oxide by firing a mixture obtained by mixing raw materials by each predetermined amount, washing this with 500 ml or more of water, relative to 100 g of the relevant lithium composite oxide, dehydrating, and performing a series of the steps from water washing to dehydration within 4 hours, and then drying the dehydrated lithium nickel composite oxide, till residual moisture content, when measured at a measurement temperature of 250° C., using a Karl Fischer moisture meter, attains 800 ppm or less, in a constant temperature chamber having air atmosphere of 200° C. or higher, or vacuum atmosphere. In this way, lithium carbonate or lithium sulfate generating during synthesis of the relevant lithium composite oxide can be removed sufficiently, or re-crystallization of Li ions can be prevented as well. And, by using the positive electrode active material obtained in this way, it is said that the non-aqueous electrolyte secondary battery having not only enhanced charge-discharge efficiency but also gas generation suppressed even under high temperature environment (Refer to pages 2, 3 and 4 of PATENT LITERATURE 3).

However, by water washing the lithium nickel composite oxide at random, there are problems of giving unclear influence on change of specific surface area and enhancement of heat stability after water washing, and giving the case of low slurry concentration in water washing, or elution of a large quantity of lithium ions, or generation of structural change, that is change of a substance itself, caused by high temperature, in the case of limiting to the lithium nickel composite oxide, caused by high temperature processing after water washing.

To eliminate these problems, the present inventors have previously proposed a method for obtaining powder of the lithium nickel composite oxide having superior characteristics, by using (a) a step for preparing the nickel oxide by firing the nickel hydroxide or the nickel oxyhydroxide containing nickel as a main component, and at least one kind of an element selected from other transition metal element, the second group element and the thirteenth group element, as a minor component under air atmosphere at a specific temperature range; (b) a step for preparing fired powder represented by represented by the composition formula (1):

$$LiNi_{1-a}M_aO_2 \qquad (1)$$

(wherein M represents at least one kind of an element selected from a transition metal element other than Ni, the second group element and the thirteenth group element; a satisfies $0.01 \leq a \leq 0.5$), by mixing the nickel oxide and a lithium compound under oxygen atmosphere at a specific temperature range; and (c) a step for filtering and drying, after water washing the fired powder in water for specific period (Refer to pages 1 and 2 of PATENT LITERATURE 4).

One of the characteristics of this method is in adjustment of relation between water washing time (A), as a specific water washing time in the step (c), and a slurry concentration (B) of the lithium nickel composite oxide, within a range satisfying AB/40 (wherein A represents the water washing time indicated by a unit of minute; and B represents the slurry concentration indicated by a unit of g/L), and by adjustment of this water washing time, the positive electrode active material, having a true specific surface area obtained by washing off the impurities at the surface of fired powder, of 0.3 to 2.0 m²/g, can be obtained, resulting in large capacity, low price and superior heat stability, suitable as the non-aqueous electrolyte secondary battery.

In this way, we have come to accomplish a proposal satisfying to certain extent, as for a problem of obtaining the positive electrode active material for the non-aqueous electrolyte secondary battery having large capacity, low price and superior heat stability.

However, in recent years, a lithium ion non-aqueous electrolyte secondary battery has begun to be used in power tool applications such as electric tools other than a mobile phone, and mounting it onto a large current device has already been started, and thus rapid expansion of a market of the power-type non-aqueous electrolyte secondary battery as a power application is expected.

As a point to be put importance as performance of such a power-type non-aqueous electrolyte secondary battery, there is output characteristics other than conventionally required battery capacity and heat stability. Insufficient output characteristics of a battery generate a problem of inability of complete utilization of battery performance. As for output characteristics of a battery, inner resistance of the positive electrode active material has large influence, and small inner resistance is desired. The positive electrode active material obtained by the above production method proposed by the present applicants was not necessarily sufficient in view of inner resistance thereof, although it satisfies battery capacity and heat stability, as described above.

In view of the above circumstance, it has been required to obtain the positive electrode active material having inner resistance about 30% lower than a conventional level, as for output characteristics, while maintaining characteristics at least equivalent to or higher than the positive electrode active material obtained by the above production method, as for battery capacity and heat stability, and to realize the non-aqueous electrolyte secondary battery with high energy density, using the same.

CITATION LIST

Patent Literature

PATENT LITERATURE 1: 5-242891 (refer to pages 1 and 2)
PATENT LITERATURE 2: 6-342657 (refer to page 2)
PATENT LITERATURE 3: 2003-017054 (refer to pages 2, 3 and 4)
PATENT LITERATURE 4: 2007-273108 (refer to pages 1 and 2)

SUMMARY OF INVENTION

Technical Problem

In view of the above conventional technical problems, it is an object of the present invention to provide the lithium nickel composite oxide for the positive electrode active material, having inner resistance smaller than a conventional one, and at least equivalent degree of battery capacity and thermal stability as a conventional one, a method for producing the same, and still more a non-aqueous electrolyte battery using the same.

Solution to Problem

The present inventors have intensively studied a way to solve the above-described problems and as the result, have discovered that content of the step (c), in the production method for the lithium nickel composite oxide, including the steps (a) to (c) previously proposed by the present inventors, particularly, a way to perform the drying step after water washing fired powder of the lithium nickel composite oxide has big influence on inner resistance, and after further investigation based on this knowledge, we have found that, by performing the drying step under specific temperature condition, and that in two stages, even in the lithium nickel composite oxide which generally has low water resistance and tends to generate denaturation caused by contacting with water, inner resistance thereof can be made small, while maintaining high battery capacity and heat stability, and have thus completed the present invention.

That is, according to a first aspect of the present invention, there is provided a method for producing a lithium nickel composite oxide for a positive electrode active material, represented by the following formula (1):

$$Li_bNi_{1-a}M_aO_2 \qquad (1)$$

(wherein M represents a minor component of at least one kind of an element selected from a transition metal element other than Ni, the second group element and the thirteenth group element; a satisfies $0.01 \leq a \leq 0.5$; and b satisfies $0.9 \leq b \leq 1.1$), characterized by comprising the following steps (a) to (c):
(a) to prepare a nickel compound selected from a nickel hydroxide, a nickel oxyhydroxide or a nickel oxide, by either method for preparing the nickel hydroxide or the nickel oxyhydroxide containing nickel as a main component, and at least one kind of element selected from other transition metal element, the second group element and the thirteenth group element, as a minor component; or by method for preparing a nickel oxide by subsequently roasting the resultant nickel hydroxide or the nickel oxyhydroxide;

(b) to mix the nickel compound and a lithium compound so that the amount of lithium in the lithium compound becomes 1.00 to 1.15 in molar ratio, relative to the total amount of nickel and the minor component in the nickel compound, and then to fire the mixture under oxygen atmosphere in a range of a maximum temperature of 650 to 850° C.;

(c) to perform drying in two stages, in obtaining the lithium nickel composite oxide by filtering and drying, after water washing the fired substance obtained in the step (b), where the first stage drying is performed at equal to or lower than 90° C., till moisture (moisture content measured at a vaporization temperature of 300° C.) in the lithium nickel composite oxide is reduced to equal to or lower that 1% by mass, and then the second stage drying is performed at equal to or higher than 120° C.

In addition, according to a second aspect of the present invention, there is provided a method for producing the lithium nickel composite oxide for the positive electrode active material, characterized in that, in the step (c), the first stage drying and the second stage drying are performed under gas atmosphere where content of compound components containing carbon is equal to or lower than 0.01% by volume, or under vacuum atmosphere.

In addition, according to a third aspect of the present invention, there is provided, in addition to the first or the second aspect, a method for producing the lithium nickel composite oxide for the positive electrode active material, characterized in that the nickel hydroxide described in the above (a) is prepared by dropping an aqueous solution of a metal compound which contains a nickel as a main component, and at least one kind of an element selected from other transition metal element, the second group element and the thirteenth group element as a minor component; and an aqueous solution which contains an ammonium ion supplying substance, into a reaction chamber warmed, wherein an aqueous solution of an alkali metal hydroxide, in an amount sufficient to maintain a reaction solution in an alkaline state, is dropped optionally, as appropriate.

In addition, according to a fourth aspect of the present invention, there is provided, in addition to the first or the second aspect, a method for producing the lithium nickel composite oxide for the positive electrode active material, characterized in that the nickel oxyhydroxide described in the above (a) is prepared by dropping an aqueous solution of a metal compound which contains a nickel as a main component, and at least one kind of an element selected from other transition metal element, the second group element and the thirteenth group element as a minor component; and an aqueous solution which contains an ammonium ion supplying substance, into a reaction chamber warmed, wherein an aqueous solution of an alkali metal hydroxide, in an amount sufficient to maintain a reaction solution in an alkaline state, is dropped optionally, as appropriate, and subsequently by further adding an oxidizing agent.

In addition, according to a fifth aspect of the present invention, there is provided, in addition to the first or the second aspect, a method for producing the lithium nickel composite oxide for the positive electrode active material, characterized in that the nickel oxide described in the above (a) is produced by roasting a nickel hydroxide or a nickel oxyhydroxide under air atmosphere at a temperature of 600 to 1100° C.

In addition, according to a sixth aspect of the present invention, there is provided, in addition to any one of the first to the fifth aspects, a method for producing the lithium nickel composite oxide for the positive electrode active material, characterized in that the lithium compound is at least one kind selected from the group consisting of a hydroxide, an oxyhydroxide, an oxide, a carbonate salt, a nitrate salt and a halide of lithium.

In addition, according to a seventh aspect of the present invention there is provided a lithium nickel composite oxide for a positive electrode active material, characterized by being obtained by the production method according to any one of the first and the sixth aspects.

In addition, according to the eighth aspect of the present invention, there is provided a non-aqueous electrolyte secondary battery, characterized by using the lithium nickel composite oxide for the positive electrode active material according to the seventh aspect.

Advantageous Effects of Invention

According to the method of the present invention, the lithium nickel composite oxide is washed, and then dried at 90° C. or lower till moisture thereof becomes 1% by weigh or lower, and then dried at 120° C. or higher. And, this drying is performed under gas atmosphere where content of compound components containing carbon is equal to or lower than 0.01% by volume, or under vacuum atmosphere. In this way, the lithium composite oxide for a positive electrode active material, not containing impurities such as lithium carbonate at the crystal surface or the grain boundary, can be obtained.

In addition, the lithium nickel composite oxide of the present invention has composition thereof represented by the following formula 1, and a specific surface area thereof of 0.3 to 2.0 m²/g, and is the one having high capacity, superior heat stability and Li diffusion resistance lower than conventional ones, when used as the positive electrode active material for the non-aqueous electrolyte secondary battery, and thus suitable as the positive electrode active material for the non-aqueous electrolyte secondary battery.

Composition Formula (1)

$$Li_bNi_{1-a}M_aO_2 \tag{1}$$

Because a secondary battery of the present invention uses the above lithium nickel composite oxide having low inner resistance, as a positive electrode material, it provides high capacity, superior thermal stability and low inner resistance, and thus provides a secondary battery with high energy densi Therefore, it is suitable as the power-type non-aqueous electrolyte secondary battery now attracted attention.

The production method of the present invention is the one for enhancing characteristics of an active material itself, and a battery using the same provides the effect irrespective of the shape thereof.

DESCRIPTION OF EMBODIMENTS

Figure 1:
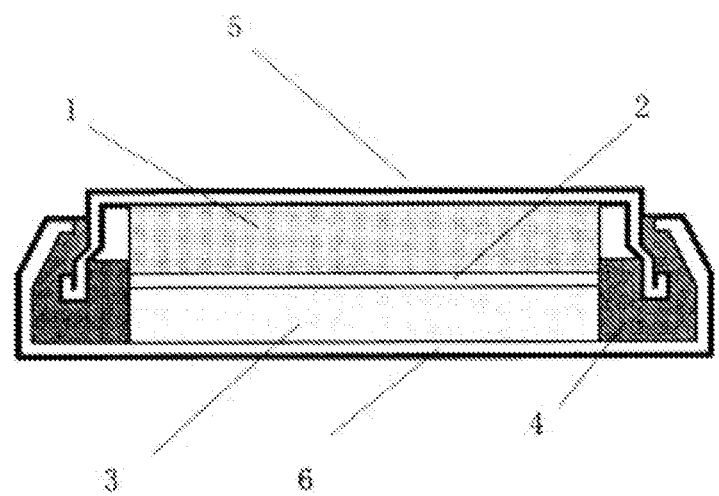
FIG. 1 is a drawing showing a schematic structure of a 2032-type coin battery.

As described above, the present invention is a method for producing the lithium nickel composite oxide for the positive electrode active material, represented by the following formula (1):

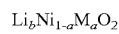
$$Li_bNi_{1-a}M_aO_2 \tag{1}$$

(wherein M represents a minor component of at least one kind of an element selected from a transition metal element other than Ni, the second group element and the thirteenth group element; a satisfies 0.01≤a≤0.5; and b satisfies 0.9≤b≤1.1), characterized by comprising the steps (a) to (c) to be described later, the lithium nickel composite oxide for the positive electrode active material obtained by method thereof, or the non-aqueous electrolyte secondary battery using the same:

Explanation will be given below in detail on each step of (a) to (c) relevant to the production method of the present invention, the lithium nickel composite oxide for the positive electrode active material, the non-aqueous electrolyte secondary battery obtained therefrom and the like.

1. The Lithium Nickel Composite Oxide for the Positive Electrode Active Material, and the Method for Producing the Same.

The production method of the lithium nickel composite oxide for the positive electrode active material of the present invention includes the following steps (a) to (c), however, the one particularly characterizing the present invention is the step (c).

The Step (a) (the Step for Preparing a Nickel Compound)

A nickel compound selected from a nickel hydroxide, a nickel oxyhydroxide or a nickel oxide is prepared, by either method for preparing the nickel hydroxide or the nickel oxyhydroxide containing nickel as a main component, and at least one kind of element selected from other transition metal element, the second group element and the thirteenth group element, as a minor component; or by method for preparing a nickel oxide by subsequently roasting the resultant nickel hydroxide or the nickel oxyhydroxide.

The Step (b) (the Step for Firing)

The nickel compound and a lithium compound is mixed so that the amount of lithium in the lithium compound becomes 1.00 to 1.15 in molar ratio, relative to the total amount of nickel in the nickel compound and the minor component, and then fired the mixture under oxygen atmosphere in a range of a maximum temperature of 650 to 850° C.

The Step (c) (the Step for Water Washing and Drying)

Drying is performed in two stages, in obtaining the lithium nickel composite oxide by filtering and drying, after water washing the fired substance obtained in the step (b), where the first stage drying is performed at equal to or lower than 90° C., till moisture (moisture content measured at a vaporization temperature of 300° C.) in the lithium nickel composite oxide is reduced to equal to or lower that 1% by mass, and then the second stage drying is performed at equal to or higher than 120° C.

The steps other than the above (c) have been disclosed fundamentally in PATENT LITERATURE 4, and thus can be referenced, however, explanation will be given in detail below by each step.

(a) The Step for Producing a Nickel Compound

This step is a step for producing and preparing the nickel compound selected from a nickel hydroxide, a nickel oxyhydroxide or a nickel oxide.

As the nickel compounds of the present invention, any one of the nickel hydroxide, the nickel oxyhydroxide or the nickel oxide can be used.

As the nickel hydroxide or the nickel oxyhydroxide, the one obtained by various methods may be used, but the one obtained via a crystallization method is preferable, on the other hand, as the nickel oxide, it is preferable to be the nickel oxide obtained by roasting the nickel hydroxide or the nickel oxyhydroxide obtained particularly by the crystallization method.

According to the crystallization method, the nickel hydroxide or the nickel oxyhydroxide forming spherical particles with high bulk density, suitable as the positive electrode active material, can be obtained, and when the lithium nickel composite oxide is produced using the resultant nickel compound, including the nickel oxide obtained by firing using this, the lithium nickel composite oxide with good filling property can be obtained, because of spherical particles having suitable bulk density. On the other hand, when the lithium nickel composite oxide is prepared using a nickel compound obtained by a method other than the crystallization method, specific surface area of the resultant composite oxide becomes very large and heat stability is deteriorated.

To obtain the nickel hydroxide by the crystallization method, it is produced by dropping an aqueous solution of nickel as a main component, and at least one kind of an element selected from other transition metal element, the second group element and the thirteenth group element as a minor component, and an aqueous solution containing an ammonium ion supplying substance, into a reaction chamber warmed, for example, at 40 to 60° C., wherein an aqueous solution of an alkali metal hydroxide, in an amount sufficient to maintain a reaction solution in an alkaline state, preferably at a pH of 10 to 14, is dropped optionally, as appropriate. In this case, it is preferable to prepare an aqueous solution of metal compounds containing nickel and a minor component, so that composition of the resultant nickel hydroxide attains the molar ratio of the main component nickel (Ni) and the minor component (M) in the above-described composition formula (1).

The temperature over 60° C. or the pH over 14 increases priority of nucleus generation in liquid and suppresses crystal growth, and thus only fine powder can be obtained. On the other hand, the temperature below 40° C., or the pH below 10 decreases generation amount of the nucleus in liquid, and increases priority of particle growth, resulting in generation of very large particles in a degree that concave-convex generates in preparing a positive electrode, which may increase residual amount of metal ions in reaction liquid and may deteriorate reaction efficiency significantly.

To obtain the nickel oxyhydroxide by the crystallization method, it is prepared by further adding an oxidizing agent such as sodium hypochloride or hydrogen peroxide into an aqueous solution generated by the above nickel hydroxide. The nickel oxyhydroxide obtained in this way is also powder with high bulk density similar to nickel hydroxide obtained by the crystallization method, and is suitable as a raw material of the lithium nickel composite oxide to be used as the positive electrode active material of a secondary battery.

As the nickel oxide, it is preferable to use the one obtained by roasting nickel hydroxide or nickel oxyhydroxide obtained by the crystallization method. It should be noted that by obtaining the lithium nickel composite oxide by reacting with a lithium compound as the nickel oxide, not only quality of the resultant lithium nickel composite oxide is stabilized but also uniform and sufficient reaction with lithium is possible.

Roasting condition to obtain the nickel oxide is not especially limited, however, it is desirable, for example, to roast under air atmosphere, at a temperature of preferably 500 to 1100° C., and more preferably 600 to 900° C. The roasting temperature below 500° C. provides inhomogeneous conversion to the nickel oxide, which makes difficult to stabilize quality of the lithium nickel composite oxide obtained by using such a nickel oxide, and easily tends to generate inhomogeneous composition in synthesis. On the other hand, the roasting temperature over 1100° C. provides abrupt particle growth of primary particles composing a nickel hydroxide particle or a nickel oxyhydroxide particle, which decreases reaction area of the nickel oxide, and inhibits reaction with lithium in preparing the subsequent lithium nickel composite oxide, and thus raises a problem of separation, by specific gravity, of a nickel compound with larger specific gravity at the lower layer, and a lithium compound in a molten state at the upper layer.

(b) The Step for Firing

This step is a step for mixing the nickel compound and the lithium compound, and then firing the resultant mixture under oxygen atmosphere.

In the above mixing, a dry-type mixing machine such as a V-blender, or a mixing granulation apparatus is used, and in addition, in the above firing, a firing furnace such as an electric furnace, a kiln, a tubular furnace, a pusher furnace is used, which is adjusted to have oxygen atmosphere, or gas atmosphere with an oxygen concentration of 20% by weight or higher, such as dry air atmosphere after dehumidification processing or carbonic acid removal processing.

In addition, the lithium compound is not especially limited, and at least one kind selected from the group consisting of a hydroxide, an oxyhydroxide, an oxide, a carbonate salt, a nitrate salt and a halide of lithium is used.

In this firing step, mixing ratio of the nickel compound and the lithium compound is adjusted so that amount of lithium in the lithium compound becomes 1.00 to 1.15 in molar ratio, relative to the total amount of nickel in the lithium nickel composite oxide and the other transition metal element, which is a minor component, the second group element and the thirteenth group element. It is because the Li/(Ni+M) ratio, after completion of water washing and drying step of the subsequent step (c), decreases by about 0.05 to 0.1 from the Li/(Ni+M) ratio in the firing step. Therefore, by setting the Li/(Ni+M) ratio at 1.00 to 1.15 in the above firing step, the lithium nickel composite oxide of the composition formula (1), which is the positive electrode active material for the secondary battery of the present invention, can be obtained finally.

In addition, the Li/(Ni+M) ratio below 1.00 provides very poor crystallinity of the resultant fired powder, which not only causes large decrease in battery capacity in charge-discharge cycle but also increases inner resistance. On the other hand, the Li/(Ni+M) ratio over 1.15 provides presence of a large quantity of an excess lithium compound at the surface of the resultant fired powder, which makes difficult to remove them by water washing. Use of the positive electrode active material, in a state that the excess lithium compound is not removed sufficiently from the surface, not only generates a large quantity of gas in charging of a battery, but also causes defect of gelling of slurry by reaction with a material such as an organic solvent to be used in preparation of an electrode, because of being powder showing high pH. Still more, the case where a large quantity of the excess lithium compound is present at the surface has big influence on the surface layer, deteriorates electric conductivity of the lithium nickel composite oxide, and increases inner resistance.

As the firing temperature, the maximal temperature in a range of preferably 650 to 850° C., and more preferably 700 to 780° C. is used. It is because, although even at the maximal temperature below 650° C., firing at a temperature over 500° C. generates the lithium nickel composite oxide, crystal of the resultant lithium nickel composite oxide is not grown well and is structurally unstable, and thus the structure is easily destroyed by phase transition or the like in charge-discharge. On the other hand, the maximal temperature over 850° C. provides collapse of a layer structure of the lithium nickel composite oxide, and makes insertion and elimination of lithium ions difficult, and still more may generate nickel oxide or the like by decomposition. Still more, it is particularly preferable to fire in two stages; at 400 to 600° C. for 1 hour or longer, and subsequently at 650 to 850° C. for 5 hours or longer, in order to uniformly react it in a temperature region where crystal growth progresses, after removing crystal water or the like of the lithium compound.

(c) The Step for Water Washing and Drying

This step is a step for obtaining the lithium nickel composite oxide by filtering and drying, after water washing the fired substance obtained in the firing step.

Slurry concentration in water washing the fired substance is not especially limited, however, it is preferably 200 to 5000 g/L, and more preferably 500 to 2000 g/L. That is, the higher slurry concentration provides the more amount of powder, and the slurry concentration over 5000 g/L not only makes stirring difficult because of very high viscosity but also slows down dissolution rate of an adhered substance due to high alkaline degree in liquid, as well as makes solid-liquid separation difficult.

On the other hand, the slurry concentration below 200 g/L increases elution amount of lithium due to too thin concentration, and tends to generate elimination of lithium from a crystal lattice of the positive electrode active material, which not only make easy crystal collapse but also re-precipitate lithium carbonate by absorbing carbon dioxide gas in air by an aqueous solution with high pH. In addition, in consideration of productivity from an industrial viewpoint, it is desirable that the slurry concentration is 500 to 2000 g/L, in view of capability of facility or workability.

Water to be used in the water washing is not especially limited, however, it is preferably water with an electric conductivity below 10 μS/cm, and more preferably water with an electric conductivity of 1 μS/cm or lower. That is, water having below 10 μS/cm, in electric conductivity measurement, is capable of preventing decrease in battery performance caused by adhering of impurities onto the positive electrode active material.

In the present invention, it is necessary to perform drying at this step after water washing and filtering, in two stages. Specifically, it is particularly important that the first stage drying is performed at equal to or lower than 90° C., till moisture content measured at a vaporization temperature of 300° C. (for example, using a Karl Fischer moisture meter) in the lithium nickel composite oxide is reduced to equal to or lower that 1% by mass, and then the second stage drying is performed at equal to or higher than 120° C. In this way, the lithium nickel composite oxide having capacity and heat stability nearly equivalent to a conventional one, and enabling to decrease Li diffusion resistance, when used as the positive electrode active material for the non-aqueous electrolyte secondary battery, can be obtained.

In general, lithium compounds such as lithium carbonate, lithium sulfate and lithium hydroxide remain as impurities at the surface or the grain boundary of crystal of the lithium nickel composite oxide obtained by firing, and when a secondary battery is constructed by using the lithium nickel composite oxide having such remained impurities, as the positive electrode active material, the resultant secondary battery has large inner resistance and thus cannot exert sufficiently performance which the original material has, in relation to battery capacity, such as charge-discharge efficiency or cycle performance.

Reason for performing water washing the fired substance in this step is because, by removing the impurity components at the surface or the grain boundary by water washing, inner resistance of the secondary battery using the positive electrode active material is decreased and battery performance, which the material has originally, can be exerted sufficiently.

In drying the lithium nickel composite oxide after water washing, conventionally, the lithium nickel composite oxide after water washing was put in a vacuum dryer, in a state that the lithium nickel composite oxide contains a large quantity of moisture, for drying at 150° C., to dry the lithium nickel composite oxide quickly and to prevent generation of lithium concentration gradient between the surface and inside of the particle (refer to Examples of PATENT LITERATURE 4). Reason for performing the drying in the present invention in two stages is as follows.

The present inventors have discovered, as a result of precise investigation on the drying process of the lithium nickel composite oxide after water washing, that it is necessary to consider the drying by dividing into two stages: a stage for evaporation of a large quantity of water contained in powder (the first stage), and a stage for further evaporation of residual trace amount of absorbed water, depending on drying temperature (the second stage).

That is, it is because, when the lithium nickel composite oxide, in a state of containing a large quantity of water, is reached a temperature over 90° C., a proton exchange reaction generates between water present and Li at the surface of the lithium nickel composite oxide, which generates change of nickel valance number, generates an oxyhydroxide, resulting in large deterioration of electric conductivity of the lithium nickel composite oxide after drying.

In the present invention, reason for performing the first stage drying at equal to or lower than 90° C., till moisture content measured at a vaporization temperature of 300° C. (for example, using a Karl Fischer moisture meter) in the lithium nickel composite oxide is reduced to equal to or lower that 1% by mass is to prevent the above proton exchange reaction between water and Li, because it occurs in a state where the moisture content is over 1% by mass. It should be noted that it is preferable to set drying temperature at the first stage at 80° C. or lower, to further suppress influence on the surface layer.

It should be noted that lower limit of the drying temperature at the first stage is not especially limited, and it may be set at temperature where moisture evaporates, however, it is preferable to set at 30° C. or higher. It is because the drying temperature below 30° C. requires long period of time for drying, and elutes lithium inside the lithium nickel composite oxide to the surface, which not only influences badly on the surface layer but also deteriorates productivity, and is not preferable from an industrial viewpoint as well.

The second stage of drying is a step for further evaporation of residual trace amount of absorbed water, depending on drying temperature, and heat treatment is performed till required moisture content is attained, depending on a use object or a use method of the resultant lithium nickel composite oxide. Temperature which the powder of the lithium nickel composite oxide should reach in the second stage is set at 120° C. or higher, however, it is preferably 120 to 700° C., more preferably 150 to 550° C., and still more preferably 180 to 350° C. It is because the drying at below 120° C. provides incomplete removing of absorbed water, and nearly 0.2% by mass of moisture remains, when measured at a vaporization temperature of 300° C., and when an electrode sheet is prepared using the lithium nickel composite oxide having such amount of moisture, as a positive electrode mixture, it causes gelling by reaction with the organic solvent in kneading or the like.

On the other hand, because it is estimated that the vicinity of the surface of the lithium nickel composite oxide is in a state very near to stoichiometric ratio or near a charged state by elimination of lithium to certain extent, the drying temperature over 700° C. could incur decrease in electric characteristics by collapse of a crystal structure of the powder surface close to a charged state.

A measurement method for moisture content is not especially limited, however, it is preferable to be performed under condition of a vaporization temperature of 300° C., using a Karl Fischer moisture meter as in the present invention.

It is preferable that, in any of the first stage and the second stage of drying of the present invention, it is performed under gas atmosphere where content of compound components containing carbon is equal to or lower than 0.01% by volume, or under vacuum atmosphere. It is because the containment of a compound component containing carbon in atmosphere over 0.01% by volume results in formation of lithium carbonate at the surface of the lithium nickel composite oxide, which increases inner resistance and incurs deterioration of battery characteristics by this lithium carbonate, when used as the positive electrode active material.

Moisture content of powder after completion of the second stage drying is not especially limited, however, it is preferably 0.2% by mass, more preferably 0.1% by mass, and still more preferably 0.05% by mass. That is, it is because the moisture content of the powder over 0.2% by mass provides opportunity of generating a lithium compound at the surface by absorbing a gas component containing carbon or sulfur in air.

The lithium nickel composite oxide obtained by the method of the present invention is the lithium nickel composite oxide having a specific surface area thereof of 0.3 to 2.0 m²/g, represented by the following composition formula, and is low cost and superior in heat stability with an inner resistance of about 30% lower than a conventional one, which is suitable as the positive electrode active material for the non-aqueous electrolyte secondary battery. It should be noted that a range outside of the present composition deteriorates any of the battery performances.

Composition formula (1):

$$Li_bNi_{1-a}M_aO_2 \tag{1}$$

(wherein N represents a minor component of at least one kind of an element selected from a transition metal element other than Ni, the second group element and the thirteenth group element; a satisfies 0.01≤a≤0.5; and b satisfies 0.90≤b≤1.1)

2. The Non-Aqueous Electrolyte Secondary Battery

The non-aqueous electrolyte secondary battery of the present invention is the non-aqueous electrolyte secondary battery having large capacity, high output and high safety, by preparing the positive electrode using the lithium nickel composite oxide obtained by the above production method, as the positive electrode active material, and incorporating this.

Explanation will be given here on the preparation method for the positive electrode to be used in the non-aqueous electrolyte secondary battery of the present invention, however, the method is not especially limited thereto, and other known methods may be used as well. For example, the positive electrode may be prepared in which the positive electrode mixture containing the positive electrode active material particle and the binding agent is supported on a band-like positive electrode core material (positive electrode collector). It should be noted that into the positive electrode mixture, other additives such as an electric conductive material may be contained as arbitrary components. Supporting of the positive electrode mixture on the core material may be performed by producing a paste where the positive electrode mixture is dispersed in a liquid component, and by applying the paste onto the core material and drying it.

As the binding agent of the positive electrode mixture, any of a thermoplastic resin or a thermosetting resin may be used, however, the thermoplastic resin is preferable. As the above thermoplastic resin, there is included, for example, polyethylene, polypropylene, polytetrafluoroethylene (PTFE), polyvinylidene fluoride (PVDF), a styrene-butadiene rubber, tetrafluoroethylene-hexafluoropropylene copolymer (FEP), a tetrafluoroethylene-perfluoroalkyl vinyl ether copolymer (PFA), vinylidene fluoride-hexafluoropropylene copolymer, a vinylidene fluoride-chlorotrifluoroethylene copolymer, an ethylene-tetrafluoroethylene copolymer (ETFE), polychlorotrifluoroethylene (PCTFE), a vinylidene fluoride-pentafluoropropylene copolymer, a propylene-tetrafluoroethylene copolymer, an ethylene-chlorotrifluoroethylene copolymer (ECTFE), a vinylidene fluoride-hexafluoropropylene-tetrafluoroethylene copolymer, a vinylidene fluoride-perfluoromethyl vinyl ether-tetrafluoroethylene copolymer, an ethylene-acrylic acid copolymer, an ethylene-methacrylic acid copolymer, an ethylene-methyl acrylate copolymer, an ethylene-methyl methacrylate copolymer or the like. They may be used alone or two or more kinds in combination. In addition, they may be cross-linked substances by $Na^+$ ion or the like.

As the electric conducting material of the positive electrode mixture, any one may be used as long as it is an electron conductive material which is chemically stable in a battery. For example, there may be used graphites such as natural graphite (scale-like graphite, or the like), artificial graphite; carbon blacks such as acetylene black, Ketjen black, channel black, furnace black, lamp black, thermal black; conductive fibers such as carbon fiber, metal fiber; metal powders such as aluminum; conductive whiskers such as zinc oxide, potassium titanate; a conductive metal oxide such as titanium oxide; and organic conductive material such as a polyphenylene derivative; carbon fluoride or the like. They may be used alone or two or more kinds in combination.

The addition amount of the electric conducting material of the positive electrode mixture is not especially limited, and it is preferably 0.5 to 50% by weight, more preferably 0.5 to 30% by weight, and still more preferably 0.5 to 15% by weight, relative to the positive electrode active material particle contained in the positive electrode mixture.

As the positive electrode core material (the positive electrode collector), any one may be used as long as it is an electron conductive material which is chemically stable in a battery. For example, a foil or a sheet composed of aluminum, stainless steel, nickel, titanium, carbon, a conductive resin or the like can be used, and among these, the aluminum foil, the aluminum alloy foil and the like are more preferable. In this case, it is also possible to furnish a carbon or titanium layer, or form an oxide layer at the surface of the foil or the sheet. In addition, it is also possible to furnish a concave-convex at the surface of the foil or the sheet, and a net, a punching sheet, a lath substance, a porous substance, a foamed substance, a fiber group compact and the like may also be used.

Thickness of the positive electrode core material is not especially limited, and, for example, 1 to 500 µm is used.

Explanation will be given next on composition elements other than the positive electrode, to be used in the non-aqueous electrolyte secondary battery of the present invention.

It should be noted that the non-aqueous electrolyte secondary battery of the present invention has characteristics in using the above positive electrode active material, and other composition elements are not especially limited, and other known methods may be used as well.

Firstly, as a negative electrode, the one capable of charging and discharging lithium is used, and the one, for example, containing a negative electrode active material and binding agent and supporting a negative electrode mixture containing an electric conductive material or a thickener as an arbitrary component on a negative electrode core material may be used. Such a negative electrode may be produced by a similar method as in the positive electrode.

As the negative electrode active material, any one may be used as long as it is a material capable of electrochemically charging and discharging lithium. For example, graphite, a non-graphitizing carbon material, a lithium alloy or the like may be used. As the lithium alloy, it is preferable to be an alloy containing at least one kind of an element selected from the group consisting of silicon, tin, aluminum, zinc and magnesium.

Average particle diameter of the negative electrode active material is not especially limited, and, for example, 1 to 30 µm is used.

As the binding agent of the negative electrode mixture, any of a thermoplastic resin or a thermosetting resin may be used, however, the thermoplastic resin is preferable. As the above thermoplastic resin, there is included, for example, polyethylene, polypropylene, polytetrafluoroethylene (PTFE), polyvinylidene fluoride (PVDF), a styrene-butadiene rubber, tetrafluoroethylene-hexafluoropropylene copolymer (FEP), a tetrafluoroethylene-perfluoroalkyl vinyl ether copolymer (PFA), vinylidene fluoride-hexafluoropropylene copolymer, a vinylidene fluoride-chlorotrifluoroethylene copolymer, an ethylene-tetrafluoroethylene copolymer (ETFE), polychlorotrifluoroethylene (PCTFE), a vinylidene fluoride-pentafluoropropylene copolymer, a propylene-tetrafluoroethylene copolymer, an ethylene-chlorotrifluoroethylene copolymer (ECTFE), a vinylidene fluoride-hexafluoropropylene-tetrafluoroethylene copolymer, a vinylidene fluoride-perfluoromethyl vinyl ether-tetrafluoroethylene copolymer, an ethylene-acrylic acid copolymer, an ethylene-methacrylic acid copolymer, an ethylene-methyl acrylate copolymer, an ethylene-methyl methacrylate copolymer or the like. They may be used alone or two or more kinds in combination. In addition, they may be cross-linked substances by $Na^+$ ion or the like.

As the electric conducting material of the negative electrode mixture, any one may be used as long as it is an electron conductive material which is chemically stable in a battery. For example, there may be used graphites such as natural graphite (scale-like graphite, or the like), artificial graphite; carbon blacks such as acetylene black, Ketjen black, channel black, furnace black, lamp black, thermal black; conductive fibers such as carbon fiber, metal fiber; powders of a metal such as aluminum; conductive whiskers such as zinc oxide, potassium titanate; a conductive metal oxide such as titanium oxide; and organic conductive material such as a polyphenylene derivative; or the like. They may be used alone or two or more kinds in combination.

The addition amount of the electric conducting material is not especially limited, and it is preferably 1 to 30% by weight, and more preferably 1 to 10% by weight, relative to the negative electrode active material particle contained in the negative electrode mixture.

As the negative electrode core material (the negative electrode collector), any one may be used as long as it is an electron conductive material which is chemically stable in a battery. For example, a foil or a sheet composed of stainless steel, nickel, copper, titanium, carbon, a conductive resin or the like may be used, and among these, the copper and the copper alloy are preferable. It is also possible to furnish a carbon, titanium or nickel layer, or form an oxide layer at the surface of the foil or the sheet. In addition, it is also possible to furnish a concave-convex at the surface of the foil or the sheet, and a net, a punching sheet, a lath substance, a porous substance, a foamed substance, a fiber group compact and the like may also be used.

Thickness of the negative electrode core material is not especially limited, and, for example, 1 to 500 µm is used.

Next, as a non-aqueous electrolytic solution, a non-aqueous solvent dissolved with a lithium salt is preferable. In addition, as the non-aqueous solvent, there can be used, for example, cyclic carbonates such as ethylene carbonate (EC), propylene carbonate (PC), butylene carbonate (BC), vinylene carbonate (VC); chained carbonates such as dimethyl carbonate (DMC), diethyl carbonate (DEC), ethyl methyl carbonate (EMC), dipropyl carbonate (DPC); aliphatic carboxylate esters such as methyl formate, methyl acetate, methyl propionate, ethyl propionate; lactones such as γ-butyrolactone, γ-valerolactone; chained ethers such as 1,2-dimethoxyethane (DME), 1,2-diethoxyethane (DEE), ethoxy methoxy ethane (EME); cyclic ethers such as tetrahydrofuran, 2-methyltetrahydrofuran; dimethylsulfoxide, 1,3-dioxolane, formamide, acetamide, dimethylformamide, dioxolane, acetonitrile, propylnitrile, nitromethane, ethylmonoglyme, phosphoric acid tri-ester, trimethoxymetane, dioxolane derivatives, sulfolane, methylsulfolane, 1,3-dimethyl-2-imidazolidinone, 3-methyl-2-oxazolidinone, propylene carbonate derivatives, tetrahydrofuran derivatives, ethyl ether, 1,3-propane sultone, anisole, dimethylsulfoxide, N-methyl-2-pyrrolidone; or the like. These may be used alone or two or more kinds in combination. Among these, a mixed solvent of the cyclic carbonate and the chained carbonate, or a mixed solvent of the cyclic carbonate, the chained carbonate and the aliphatic carboxylate ester is preferable.

As the lithium salt, there may be included, for example, $LiClO_4$, $LiBF_4$, $LiPF_6$, $LiAlCl_4$, $LiSbF_6$, LiSCN, LiCl, $LiCF_3SO_3$, $LiCF_3CO_2$, $Li(CF_3SO_2)_2$, $LiAsF_6$, $LiN(CF_3SO_2)_2$, $LiB_{10}Cl_{10}$, lower aliphatic lithium carboxylate, LiCl, LiBr, LiI, chloroborane lithium, lithium tetraphenylborate, a lithium imidate salt or the like. These may be used alone or two or more kinds in combination. It should be noted that it is preferable to use at least $LiPF_6$.

Concentration of the lithium salt in the non-aqueous solvent is not especially limited, however, it is preferably 0.2 to 2 mol/L, and more preferably 0.5 to 1.5 mol/L.

In the non-aqueous electrolytic solution, various additives may be added to improve charge-discharge characteristics of the battery. As the additives, there may be included, for example, triethyl phosphite, triethanolamine, cyclic ether, ethylene diamine, n-glyme, pyridine, hexaphosphoric acid triamide, nitrobenzene derivatives, crown-ethers, quaternary ammonium salt, ethylene glycol dialkyl ether and the like.

In addition, between the positive electrode and the negative electrode, a separator may be intervened. As the separator, a micro porous thin membrane having large ion permeation degree and predetermined mechanical strength, as well as insulation property is preferable. As this micro porous thin membrane, the one clogging a hole at a certain temperature or higher, and having function to increase resistance is preferable. In addition, as a material of the micro porous thin membrane, polyolefin such as polypropylene, polyethylene or the like, superior in resistance to an organic solvent and having hydrophobic property is used preferably. In addition, a sheet, a nonwoven fabric, a woven fabric made of glass fiber or the like may be used as well.

As exterior diameter of the separator, it is generally set at 0.01 to 1 µm. In addition, as thickness of the separator, it is generally set at 10 to 300 µm. In addition, as void ratio of the separator, it is generally set at 30 to 80%.

Still more, a polymer electrolyte made of non-aqueous electrolytic liquid and a polymer material maintaining it can also be used as the separator, by making as one-piece substance with the positive electrode or the negative electrode. As this polymer material, any one may be used as long as it is capable of holding the non-aqueous electrolytic solution, however, a copolymer of vinylidene fluoride and hexafluoropropylene is particularly preferable.

EXAMPLES

Explanation will be given below in further detail on the present invention with reference to Examples, however, the present invention should not be limited by these Examples at all. It should be noted that an analysis method for a metal of the lithium nickel composite oxide used in Examples, and evaluation methods for moisture content and specific surface area thereof are as follows.

(1) Analysis of a metal: it was performed by an IPC emission spectrometry.

(2) Measurement of moisture content: It was measured under condition of a vaporization temperature of 300° C., using a Karl Fischer moisture meter (Grade number: MKC210, manufactured by Kyoto Electronics Producing Co., Ltd.).

(3) Measurement of specific surface area: It was performed by a BET method.

Example 1

A positive electrode active material composed of a lithium nickel composite oxide was produced by the following series of steps including the step for preparing a nickel hydroxide, the step for producing a nickel oxide, the step for firing, the step for water washing and drying, and still more by preparing a coin battery using this as a positive electrode material, it was evaluated using impedance. It should be noted that each raw material was weighed so that molar ratio of each metal component of the lithium nickel composite oxide after firing attains Ni:Co:Al:Li=0.82:0.15:0.03:1.02.

(1) The Step for Preparing a Nickel Hydroxide

Firstly, an aqueous solution was produced by mixing nickel sulfate hexahydrate (produced by Wako Pure Chemical Industries, Ltd.), cobalt sulfate heptahydrate (produced by Wako Pure Chemical Industries, Ltd.) and aluminum sulfate (produced by Wako Pure Chemical Industries, Ltd.), so as to attain the above molar ratio. This aqueous solution was dropped at the same time with ammonia water (produced by Wako Pure Chemical industries, Ltd.) and a sodium hydroxide aqueous solution (produced by Wako Pure Chemical Industries, Ltd.) into a stirring reaction chamber equipped with a discharge outlet, filled with water warmed at 50° C. At this time, by a reaction crystallization method, where pH was maintained at 11.5 and residence time was controlled so as to attain 11 hours, spherical nickel hydroxide particles, where primary particles were aggregated, were produced.

(2) The Step for Producing Fired Powder

Lithium hydroxide-monohydrate (produced by Wako Pure Chemical Industries, Ltd.) was added to the resultant nickel hydroxide so as to attain the above composition, and they were mixed using a V-blender. The resultant mixture was preliminary firing at 600° C. for 3 hours under atmosphere of an oxygen concentration of 30% or higher, using an electric furnace, and then it was subjected to main firing at 760° C. for 20 hours. After that, it was cooled to room temperature inside the furnace, and then performed cracking processing to obtain spherical fired powder where primary particles were aggregated, and composition thereof was analyzed. Analysis result of the composition is shown in Table 1.

(3) The Step for Water Washing and Drying

Pure water was added to the resultant fired powder to make slurry with a concentration of 1200 g/L, which was stirred for 50 minutes and washed with water, and then it was filtered, and powder taken out was subjected to vacuum drying while maintaining at a temperature of the fired powder at 80° C. for 15 hours (the first stage drying). After confirming that moisture content of the fired powder attained 1% by mass or lower, main drying was performed still more by raising temperature of the fired powder up to 150° C., to obtain the positive electrode active material made of the lithium nickel composite oxide. It should be noted that moisture content after drying was 0.05% by mass. In addition, a specific surface area of the fired powder after drying was measured. Measurement result of the specific surface area is shown in Table 2.

(4) Production of a Battery and Evaluation Thereof.

A battery was made by the following method, using the resultant positive electrode active material, and inner resistance was measured by impedance of the battery. Measurement result of the inner resistance is shown in Table 1.

In addition, the initial time discharge capacity and DSC calorific value were measured, the result thereof is shown in Table 2.

[A Preparation Method of a Battery]

To 90 parts by weight of the powder of the positive electrode active material, 5 parts by weight of acetylene black and 5 parts by weight of polyvinylidene fluoride were mixed, and n-methylpyrrolidone was added to make paste. This was applied onto an aluminum foil with a thickness of 20 μm, so as to attain a weight of the active material after drying of 0.05 g/cm$^2$, vacuum drying was performed at 120° C., and then a disk with a diameter of 1 cm was cut out therefrom to obtain a positive electrode.

As a negative electrode, a lithium metal was used, and as an electrolytic solution, a mixed solution of ethylene carbonate (EC) and diethylene carbonate (DEC) in equal amount, containing 1M of LiClO$_4$ as a supporting electrolyte, was used. In addition, the electrolytic solution was infiltrated into a separator made of polyethylene to prepare a 2032-type coin battery in a glove box under Ar gas atmosphere controlled at a dew point of −80° C. FIG. 1 shows a schematic structure of the 2032-type coin battery. The coin battery here is composed of a positive electrode (electrode for evaluation) 1 in a positive electrode can 5, a lithium metal negative electrode 3 in a negative e electrode can 6, a separator 2 infiltrated with the electrolytic solution, and a gasket 4.

[The Evaluation Method by Impedance]

The prepared battery was stood still for about 24 hours to stabilize OCV, and then CCCV charging was performed up to a voltage of 4.0 V under an initial time current density of 0.5 mA/cm$^2$, relative to a positive electrode. On the coin battery in a charged state, inner resistance value Rct was measured by an A.C. impedance method by scanning from a frequency of 10 kHz to 0.1 Hz under a voltage condition of 10 mV, using an impedance analyzer 1255B, manufactured by Solartron Co., Ltd, to evaluate it by a relative value using the value of Example 1 as 100. Measurement result is shown in Table 1.

A measurement method for the inner resistance value Rct (positive electrode resistance) is as follows.

Figure 2:
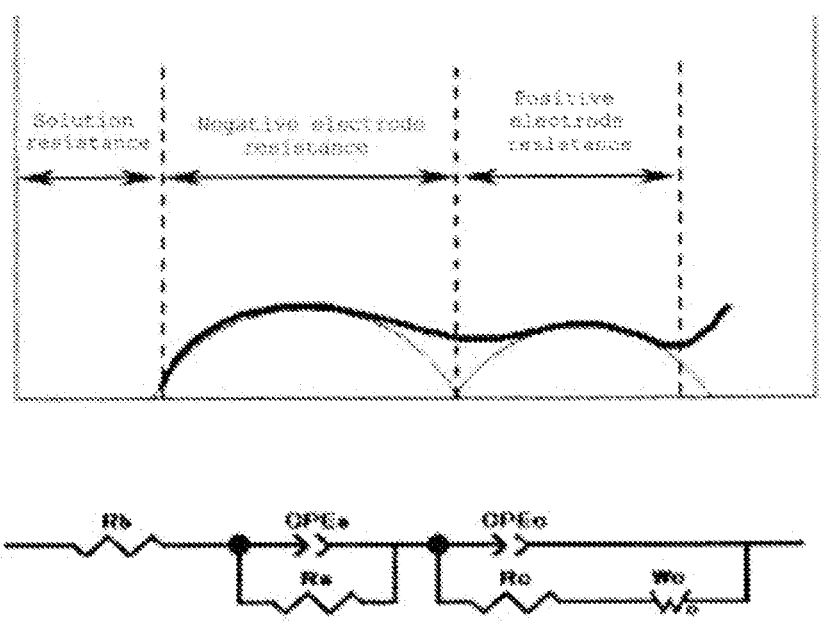
FIG. 2 is a measurement example of impedance evaluation, and an equivalent circuit used in analysis.

By performing the measurement of frequency dependence of a battery reaction by a general A.C. impedance method, as an electrochemical evaluation method, a Nyquist diagram is obtained, as shown in FIG. 2, based on a solution resistance, a negative electrode resistance and a negative electrode capacity, along with a positive electrode resistance and a positive electrode capacity. The battery reaction at the electrode is composed of a resistance component accompanied with charge transfer, and a capacity component by an electric double layer, which are expressed by an electric circuit as a parallel circuit of the resistance and the capacity, and the total battery is expressed by an equivalent circuit, where the solution resistance, and the parallel circuit of the negative electrode and the positive electrode are connected in series. Each of the resistance components and capacity components can be estimated, by performing fitting calculation on the Nyquist diagram measured by using this equivalent circuit. The positive electrode resistance is equal to diameter of a half circle at the lower frequency side of the resultant Nyquist diagram. Based on the above, by performing measurement of A.C. impedance on the positive electrode prepared and fitting calculation with the equivalent circuit for the resultant Nyquist diagram, the positive electrode resistance can be estimated.

[An Evaluation Method for the Initial Time Discharge Capacity]

The prepared battery was stood still for about 24 hours to stabilize OCV, and then a charge-discharge test was performed under a cut-off voltage of 4.3 to 3.0 V under a current density of 0.5 mA/cm$^2$, relative to a positive electrode, when initial time discharge capacity is examined. The resultant initial time discharge capacity is shown in Table 2.

[An Evaluation Method for DSC Calorific Value]

In addition, as evaluation of thermal safety, heat generation behavior of the positive electrode mixture initially charged was examined using DSC (differential scanning calorimeter) to evaluate total heat calorific value. The lower DSC calorific value means the more superior heat stability as the positive electrode active material, and enhanced safety of a battery. In more detail, similarly as in measurement of the initial time discharge capacity using the 2032-type coin battery, a prepared battery was stood still for about 24 hours to stabilize OCV, and then charged up to a voltage of 4.3 V under a current density of 0.5 mA/cm$^2$, relative to a positive electrode, and after that constant current-constant voltage charging (CCCV charging) is performed where charging is completed when a current value of 0.01 mA is attained by voltage regulation. After that, the charged coin battery is disassembled to take out the positive electrode mixture inside and the electrolytic solution adhered is removed as much as possible, so as to attain 0.05 mg or lower.

Next, 3 mg of the positive electrode mixture and 1.3 mg of the electrolytic solution used in the coin battery were put in an aluminum pan for DSC measurement, and the aluminum pan was swaged and sealed, and then by drilling a very small hole at the surface for gas venting, a sample for measurement is completed. Similarly, 3 mg of alumina powder was sampled and put into the aluminum pan and swaged as a reference electrode, to observe heat generation behavior by scanning a range from room temperature to 305° C. using DSC at a temperature raising rate of 10° C./min. The DSC apparatus used here is DSC-10A, manufactured by Rigaku Corp. The resultant DSC calorific value is shown in Table 2.

Example 2

A positive electrode active material was obtained similarly as in Example 1, except that nickel hydroxide was further subjected to oxidation treatment by the addition of sodium hypochlorite to convert to nickel oxyhydroxide in Example 1, and evaluated. Results are shown in Table 1.

Example 3

A positive electrode active material was obtained similarly as in Example 1, except that a nickel oxide was subjected to oxidative roasting at 900° C. to convert to the nickel hydroxide in Example 1, and evaluated. Results are shown in Tables 1 and 2.

Example 4

A positive electrode active material was obtained similarly as in Example 1, except that nickel sulfate hexahydrate (produced by Wako Pure Chemical Industries, Ltd.), cobalt sulfate heptahydrate (produced by Wako Pure Chemical Industries, Ltd.), aluminum sulfate (produced by Wako Pure Chemical Industries, Ltd.), and magnesium sulfate heptahydrate (produced by Pure Chemical Co., Ltd.) were mixed to prepare an aqueous solution, so that molar ratio of each metal component of the lithium nickel composite oxide after firing becomes Ni:Co:Al:Mg:Li=0.804:0.148:0.036:0.012:1.02, and evaluated. Results are shown in Tables 1 and 2.

Example 5

A positive electrode active material was obtained similarly as in Example 1, except that nickel sulfate hexahydrate (produced by Wako Pure Chemical Industries, Ltd.), cobalt sulfate heptahydrate (produced by Wako Pure Chemical Industries, Ltd.), aluminum sulfate (produced by Wako Pure Chemical Industries, Ltd.), and manganese sulfate pentahydrate (produced by Pure Chemical Co., Ltd.) were mixed to produce an aqueous solution, so that molar ratio of each metal component of the lithium nickel composite oxide after firing becomes Ni:Co:Al:Mn:Li=0.786:0.151:0.035:0.028:1.02, and evaluated. Results are shown in Table 1.

Example 6

A positive electrode active material was obtained similarly as in Example 1, except that lithium oxide was used instead of lithium hydroxide-monohydrate, and evaluated. Results are shown in Table 1.

Example 7

A positive electrode active material was obtained similarly as in Example 1, except that temperature of main firing in the firing step was set at 650° C., and evaluated. Results are shown in Tables 1 and 2.

Example 8

A positive electrode active material was obtained similarly as in Example 1, except that temperature of main firing in the firing step was set at 850° C., and evaluated. Results are shown in Tables 1 and 2.

Example 9

A positive electrode active material was obtained similarly as in Example 1, except that drying condition at the first stage drying in the step for water washing and drying was maintained at 70° C. for 15 hours, and evaluated. Results are shown in Table 1.

Example 10

A positive electrode active material was obtained similarly as in Example 1, except that drying condition at the first stage drying in the step for water washing and drying was maintained at 90° C. for 15 hours, and evaluated. Results are shown in Table 1.

Example 11

A positive electrode active material was obtained similarly as in Example 1, except that drying condition at the second stage drying in the step for water washing and drying was performed as main drying at 250° C., and evaluated. Results are shown in Tables 1 and 2.

Comparative Example 1

A positive electrode active material was obtained similarly as in Example 1, except that molar ratio of each metal component of the lithium nickel composite oxide after firing was prepared so as to become Ni:Co:Al:Li=0.82:0.151:0.03:0.98, and evaluated. Results are shown in Tables 1 and 2.

Comparative Example 2

A positive electrode active material was obtained similarly as in Example 1, except that molar ratio of each metal component of the lithium nickel composite oxide after firing was prepared so as to become Ni:Co:Al:Li=0.82:0.151:0.03:1.20, and evaluated. Results are shown in Table 1.

Comparative Example 3

A positive electrode active material was obtained similarly as in Example 1, except that temperature of main firing in the firing step was set at 600° C., and evaluated. Results are shown in Table 1.

Comparative Example 4

A positive electrode active material was obtained similarly as in Example 1, except that temperature of main firing in the firing step was set at 1000° C., and evaluated. Results are shown in Table 1.

Comparative Example 5

A positive electrode active material was obtained similarly as in Example 1, except that drying condition at the first stage drying in the step for water washing and drying was maintained at 110° C. for 15 hours, and evaluated. Results are shown in Table 1.

TABLE 1

| | Raw material form of nickel oxide | Chemical composition after firing | Chemical composition after water washing | Li raw material | Firing temperature (°C.) | Vaporization temperature of moisture in drying (°C.) | Resistance Rct (a.u.) |
|---|---|---|---|---|---|---|---|
| Example 1 | Nickel hydroxide | $Li_{1.02}Ni_{0.81}Co_{0.16}Al_{0.03}O_2$ | $Li_{0.95}Ni_{0.81}Co_{0.16}Al_{0.03}O_2$ | $LiOH \cdot H_2O$ | 760 | 80 | 100 |
| Example 2 | Nickel oxyhydroxide | $Li_{1.02}Ni_{0.82}Co_{0.15}Al_{0.03}O_2$ | $Li_{0.94}Ni_{0.82}Co_{0.15}Al_{0.03}O_2$ | $LiOH \cdot H_2O$ | 760 | 80 | 99 |
| Example 3 | Nickel oxide | $Li_{1.02}Ni_{0.82}Co_{0.15}Al_{0.03}O_2$ | $Li_{0.95}Ni_{0.82}Co_{0.15}Al_{0.03}O_2$ | $LiOH \cdot H_2O$ | 760 | 80 | 97 |
| Example 4 | Nickel oxide | $Li_{1.02}Ni_{0.804}Co_{0.148}Al_{0.036}Mg_{0.012}O_2$ | $Li_{0.96}Ni_{0.804}Co_{0.148}Al_{0.036}Mg_{0.012}O_2$ | $LiOH \cdot H_2O$ | 760 | 80 | 98 |
| Example 5 | Nickel oxide | $Li_{1.02}Ni_{0.786}Co_{0.151}Al_{0.035}Mn_{0.028}O_2$ | $Li_{0.96}Ni_{0.786}Co_{0.151}Al_{0.035}Mn_{0.028}O_2$ | $LiOH \cdot H_2O$ | 760 | 80 | 101 |
| Example 6 | Nickel oxide | $Li_{1.02}Ni_{0.82}Co_{0.15}Al_{0.03}O_2$ | $Li_{0.94}Ni_{0.82}Co_{0.15}Al_{0.03}O_2$ | $Li_2O$ | 760 | 80 | 99 |
| Example 7 | Nickel oxide | $Li_{1.02}Ni_{0.81}Co_{0.16}Al_{0.03}O_2$ | $Li_{0.95}Ni_{0.81}Co_{0.16}Al_{0.03}O_2$ | $LiOH \cdot H_2O$ | 650 | 80 | 102 |
| Example 8 | Nickel oxide | $Li_{1.02}Ni_{0.83}Co_{0.14}Al_{0.03}O_2$ | $Li_{0.95}Ni_{0.83}Co_{0.14}Al_{0.03}O_2$ | $LiOH \cdot H_2O$ | 850 | 80 | 105 |
| Example 9 | Nickel oxide | $Li_{1.02}Ni_{0.81}Co_{0.16}Al_{0.03}O_2$ | $Li_{0.96}Ni_{0.81}Co_{0.16}Al_{0.03}O_2$ | $LiOH \cdot H_2O$ | 760 | 70 | 93 |
| Example 10 | Nickel oxide | $Li_{1.02}Ni_{0.82}Co_{0.15}Al_{0.03}O_2$ | $Li_{0.94}Ni_{0.82}Co_{0.15}Al_{0.03}O_2$ | $LiOH \cdot H_2O$ | 760 | 90 | 107 |
| Example 11 | Nickel hydroxide | $Li_{1.02}Ni_{0.81}Co_{0.16}Al_{0.03}O_2$ | $Li_{0.95}Ni_{0.81}Co_{0.16}Al_{0.03}O_2$ | $LiOH \cdot H2O$ | 760 | 80 | 96 |
| Comparative Example 1 | Nickel oxide | $Li_{0.98}Ni_{0.82}Co_{0.15}Al_{0.03}O_2$ | $Li_{0.89}Ni_{0.82}Co_{0.15}Al_{0.03}O_2$ | $LiOH \cdot H_2O$ | 760 | 80 | 151 |
| Comparative Example 2 | Nickel oxide | $Li_{1.20}Ni_{0.82}Co_{0.15}Al_{0.03}O_2$ | $Li_{1.13}Ni_{0.82}Co_{0.15}Al_{0.03}O_2$ | $LiOH \cdot H_2O$ | 760 | 80 | 173 |
| Comparative Example 3 | Nickel oxide | $Li_{1.02}Ni_{0.82}Co_{0.15}Al_{0.03}O_2$ | $Li_{0.95}Ni_{0.82}Co_{0.15}Al_{0.03}O_2$ | $LiOH \cdot H_2O$ | 600 | 80 | 140 |
| Comparative Example 4 | Nickel oxide | $Li_xNi_yCo_zAl_{(1-y-z)}O_2$ + impurity phase | $Li_xNi_yCo_zAl_{(1-y-z)}O_2$ + impurity phase | $LiOH \cdot H_2O$ | 1000 | 80 | 196 |
| Comparative Example 5 | Nickel oxide | $Li_{1.02}Ni_{0.82}Co_{0.15}Al_{0.03}O_2$ | $Li_{0.96}Ni_{0.82}Co_{0.15}Al_{0.03}O_2$ | $LiOH \cdot H_2O$ | 760 | 110 | 218 |

TABLE 2

| | Specific surface area | Initial time discharge capacity | DSC calorific value, relative value |
|---|---|---|---|
| Example 1 | 1.34 m$^2$/g | 185 mAh/g | 100 |
| Example 4 | 1.62 m$^2$/g | 188 mAh/g | 102 |
| Example 7 | 1.42 m$^2$/g | 184 mAh/g | 106 |
| Example 8 | 0.98 m$^2$/g | 179 mAh/g | 98 |
| Example 11 | 1.24 m$^2$/g | 187 mAh/g | 99 |
| Comparative Example 1 | 1.84 m$^2$/g | 175 mAh/g | 110 |

It is understood from Table 1 that, in Examples 1 to 11, where production was performed according to conditions of the production method of the present invention, as well as water washing treatment was performed under conditions of the present invention, internal resistance Rct by impedance evaluation of a battery, prepared by using the resultant positive electrode active material, was decreased.

On the contrary, in Comparative Examples 1 to 5, the above conditions were not satisfied, and thus internal resistance of a battery using the resultant positive electrode active material was large and it cannot be desired to increase capacity of a battery.

It is understood from Table 2 that in Examples 1, 4, 7, 8 and 11, where production was performed according to conditions of the production method of the present invention, as well as water washing treatment was performed under conditions of the present invention, specific surface area (specific surface area after drying) of the resultant lithium nickel composite oxide was 0.3 to 2.0 m$^2$/g, smaller specific surface area as compared with one obtained in Comparative Example 1, and it is understood from Table 2 that any of the batteries prepared by using this as the positive electrode active material has high capacity and enhanced safety.

INDUSTRIAL APPLICABILITY

As is clear from the above, the positive electrode active material for the non-aqueous electrolyte secondary battery of the present invention is the positive electrode active material for the non-aqueous electrolyte secondary battery composed of the lithium nickel composite oxide with small internal resistance, and thus the non-aqueous electrolyte secondary battery with high capacity, obtained by using this, is suitable as a power-type non-aqueous electrolyte secondary battery now attracted attention in industry. Because of expectation of significant market expansion of the power-type non-aqueous electrolyte secondary battery in the future, industrial applicability of the present invention is extremely large.

REFERENCE SIGNS LIST

1 Positive electrode (electrode for evaluation)
2 Separator (infiltrated with the electrolytic solution)
3 Lithium metal negative electrode
4 Gasket
5 Positive electrode can
6 Negative electrode can

The invention claimed is:
1. A method for producing a lithium nickel composite oxide for a positive electrode active material, represented by the following formula (1):

$$Li_bNi_{1-a}M_aO_2 \qquad (1)$$

wherein M represents a minor component of at least one element selected from the group consisting of a transition metal element other than Ni, a second group element and a thirteenth group element; a satisfies 0.01≤a≤0.5; and b satisfies 0.9≤b≤1.1, comprising the following steps (a) to (c):
(a) preparing a nickel compound selected from a nickel hydroxide, a nickel oxyhydroxide or a nickel oxide, by either method for preparing the nickel hydroxide or the nickel oxyhydroxide containing nickel as a main component, and at least one element selected from the group consisting of the transition metal elements other than Ni, the second group elements and the thirteenth group elements, as a minor component; or by method for preparing a nickel oxide by subsequently roasting the resultant nickel hydroxide or the nickel oxyhydroxide;

(b) mixing the nickel compound and a lithium compound so that the amount of lithium in the lithium compound becomes 1.00 to 1.15 in molar ratio, relative to the total amount of nickel and the minor component in the nickel compound, and then firing the mixture under oxygen atmosphere in a range of a maximum temperature of 650 to 850° C.;

(c) drying in two stages, in obtaining the lithium nickel composite oxide by filtering and drying, after water washing the fired substance obtained in the step (b), where a first stage drying is performed at equal to or lower than 90° C., until moisture content measured at a vaporization temperature of 300° C. in the lithium nickel composite oxide is reduced to equal to or lower that 1% by mass, and wherein a second stage drying is performed at equal to or higher than 120° C.;

wherein, in the step (c), the first stage drying and the second stage drying are performed under vacuum atmosphere.

2. The method for producing the lithium nickel composite oxide for the positive electrode active material according to claim 1, wherein the nickel hydroxide described in the above (a) is prepared by dropping an aqueous solution of a metal compound which contains nickel as a main component, and at least one element selected from the group consisting of the transition metal element other than nickel, the second group element and the thirteenth group element as a minor component; and an aqueous solution which contains an ammonium ion supplying substance, into a reaction chamber warmed, wherein an aqueous solution of an alkali metal hydroxide, in an amount sufficient to maintain a reaction solution in an alkaline state, is dropped optionally, as appropriate.

3. The method for producing the lithium nickel composite oxide for the positive electrode active material according to claim 1, wherein the nickel oxyhydroxide described in the above (a) is prepared by dropping an aqueous solution of a metal compound which contains nickel as a main component, and at least one element selected from the group consisting of the transition metal element other than Ni, the second group element and the thirteenth group element as a minor component; and an aqueous solution which contains an ammonium ion supplying substance, into a reaction chamber warmed, wherein an aqueous solution of an alkali metal hydroxide, in an amount sufficient to maintain a reaction solution in an alkaline state, is dropped optionally, as appropriate, and subsequently by further adding an oxidizing agent.

4. The method for producing the lithium nickel composite oxide for the positive electrode active material according to claim 1, wherein the nickel oxide described in the above (a) is prepared by roasting nickel hydroxide or nickel oxyhydroxide under air atmosphere at a temperature of 600 to 1100° C.

5. The method for producing the lithium nickel composite oxide for the positive electrode active material according to claim 1, wherein the lithium compound is at least one kind selected from the group consisting of a hydroxide, an oxyhydroxide, an oxide, a carbonate salt, a nitrate salt and a halide of lithium.

6. A lithium nickel composite oxide for a positive electrode active material, is obtained by the production method according to claim 1.

7. A non-aqueous electrolyte secondary battery, characterized by using the lithium nickel composite oxide for the positive electrode active material according to claim 6.

8. The method for producing the lithium nickel composite oxide for the positive electrode active material according to claim 1, wherein a second stage drying is performed at equal to or higher than 120° C., until moisture content measure at a vaporization temperature of 300° C. in the lithium nickel composite oxide is reduced to equal to or lower than 0.2% by mass.

* * * * *